(12) United States Patent
Yip et al.

(10) Patent No.: US 7,696,971 B2
(45) Date of Patent: Apr. 13, 2010

(54) METHOD, MATERIALS AND APPARATUS FOR DRIVING GRAY-SCALE BISTABLE CHOLESTERIC DISPLAYS

(75) Inventors: Wing Chiu Yip, Chai Wan (HK); Hoi Sing Kwok, Kowloon (HK); Cheryl Sun, New Territories (HK)

(73) Assignees: The Hong Kong University of Science and Technology, Hong Kong (HK); Wing-Chiu Larry Yip, Hong Kong (HK)

( * ) Notice: Subject to any disclaimer, the term of this patent is extended or adjusted under 35 U.S.C. 154(b) by 847 days.

(21) Appl. No.: 10/141,929

(22) Filed: May 10, 2002

(65) Prior Publication Data

US 2003/0030612 A1 Feb. 13, 2003

Related U.S. Application Data

(60) Provisional application No. 60/290,671, filed on May 15, 2001.

(51) Int. Cl.
*G09G 3/36* (2006.01)
(52) U.S. Cl. .......................................... 345/97; 345/95
(58) Field of Classification Search .................. 345/97, 345/94, 95, 99, 89; 349/12, 169
See application file for complete search history.

(56) References Cited

U.S. PATENT DOCUMENTS

| 5,748,277 | A | * | 5/1998 | Huang et al. ................. 349/169 |
| 5,847,798 | A | * | 12/1998 | Yang et al. ................... 349/169 |
| 6,052,103 | A | * | 4/2000 | Fujiwara et al. ............... 345/89 |
| 6,104,448 | A | * | 8/2000 | Doane et al. ................... 349/12 |
| 6,268,840 | B1 | * | 7/2001 | Huang ........................... 345/94 |
| 6,473,058 | B1 | * | 10/2002 | Hotomi et al. ................ 345/1.1 |

* cited by examiner

*Primary Examiner*—Ricardo L Osorio
(74) *Attorney, Agent, or Firm*—Buchanan, Ingersoll & Rooney PC

(57) ABSTRACT

The invention provides a method for controlling the grey-scale modulation of a reflective bistable cholesteric display by applying selected sequences of high and low pulses to modulate the cholesteric domain size and helical axis orientation. Non-mesogenic dopants may also be added to reduce the drive voltage.

10 Claims, 19 Drawing Sheets

(a)

(b)

(a)

(b)

(a)

(b)

(a)

(b)

(a)

(b)

(c)

(a)

(b)

(a)

(b)

(a)

(b)

(c)

METHOD, MATERIALS AND APPARATUS FOR DRIVING GRAY-SCALE BISTABLE CHOLESTERIC DISPLAYS

This application claims priority under 35 U.S.C. §119 to U.S. Provisional Application No. 60/290,671 entitled Method, Materials and Apparatus for Driving Gray-Scale Bistable Cholesteric Displays and filed on May 15, 2001, the entire content of which is hereby incorporated by reference.

FIELD OF THE INVENTION

The invention relates to a method, materials and apparatus for the gray scale modulation of reflective type cholesteric liquid crystal displays. In particular the invention relates to a pulse sequence addressing scheme, which uses sets of signal sequences having identical root mean square voltage for the modulation. The optimization of electro-optic characteristics and electrical requirements are also disclosed. In addition, the dopants that lead to the voltage reduction are disclosed.

DESCRIPTION OF THE PRIOR ART

Bistable cholesteric displays (BCD) are known to have two stable states even when the applied electric field is removed. These states are often referred to as the planar and focal-conic states in accordance with the optical properties. The bright appearance at the planar state is due to the selective Bragg reflection of ambient light. It can in principle reflect as much as 50% of the ambient light within a certain spectral bandwidth. The reflectance associated with the planar state depends on the birefringence of liquid crystal mixtures, cell gap and anchoring conditions. To broaden the viewing angle, a polymer network formed in the liquid crystal medium has been demonstrated but the principle of operation is the same with the typical operation voltage of 80 Vpp. On contrary, the helical axes distribute randomly in the focal-conic state so that the light is weakly scattered in the forward and backward directions. By putting black paint at the rear glass surface of BCD, the focal-conic state will appear dark giving rise to a good contrast. This is thus advantageous for display applications that require high multiplexibility and low power consumption. As stringent cell gap control and polarizer laminations are not required, this will simplify a lot of the manufacturing processes.

To switch from the focal-conic state to the planar state, usually requires high voltage pulses to align the liquid crystal molecules homeotropically before they are relaxed rapidly to form the planar texture. On the other hand, to switch back from the planar state to the focal-conic state, there are two possible ways. The first one is to let the liquid crystal molecules relax slowly from the field-induced homeotropic alignment. Whereas the second one is to make use of the low-voltage transition threshold beyond which the planar helical structure will be upset. The former has been proposed by the research group at Kent State University, whilst the latter has been worked out independently by another group at the Hong Kong University of Science and Technology. These are the physical mechanisms for the state switching of the BCDs. Although recently more schemes have been reported, these two contributions are original. For example, the researchers at Minolta have also proposed a driving scheme for the stacked multicolour BCD. They use high voltage pulses to select the planar state and the initial state is always focal-conic. Currently, the addressing scheme proposed by the group at the Kent State University is the fastest, however it is very complex and composed of different stages (preparation, selection and evolution) of many switching cycles to address a pixel. Since the switching current can be excessively large during these cycles, it will cause a manifold increase in the loading and the parasitic couplings associated with these transients.

Intermediate reflectance, on the other hand, is due to the distributed helical axis and the different domain size of the planar cholesteric texture. The reflection spectrum of the BCD can be tuned to any of the 3 primary colours. The reflectivity is so high that it can reflect almost 50% of one-handed circular polarized light. Therefore, a stacked multi-colour BCD with different handed twists can reflect as much as 100% of the ambient light. Techniques based on the amplitude and the pulse-width modulations have been proposed and demonstrated. The present invention, at least in preferred forms, proposes a gray-scale control using different sequences of high and low bipolar pulses during each addressing interval. The permutation of these pulses can induce different reflectivity and the associated gray-level does not primarily depend on the rms voltage. In addition, since this control can be encoded in the data stream, the cost for the multi-level amplitude or pulse width modulation can be reduced drastically. Yet, for the 8 levels gray-scale control at least 3 high and low bipolar pulses are required and more pulses should be used to accommodate the discrete and non-linear nature of this pulse sequence addressing scheme. Consequently, the addressing time per line has to be lengthened and it is 5 ms in the present discussion. However this is a secondary issue because the slow response time and long settling time are the major concerns for the video-rate applications. Optimization of the liquid crystal properties should help improve these dynamic responses.

In preferred forms of this invention, it is also possible that non-mesogenic dopants may be used that lead to the voltage reduction. This reduction is roughly proportional to the concentration of this dopant and is present for driving frequencies across the audio spectrum. It is believed that this voltage reduction is primarily due to a perturbation of the intermolecular coupling in the liquid crystal mixture. It was found that so long as the long-range order was not destroyed, a sizeable reduction was possible by adding a small concentration of the dopants.

SUMMARY OF THE INVENTION

An object of the present invention is to develop a method, materials and apparatus for the gray-scale modulation of the reflective type cholesteric liquid crystal displays.

According to the present invention there is provided a method for the gray-scale modulation of bistable cholesteric displays comprising
a) a clearing period during which large clearing pulses are applied to induce the cholesteric-nematic transition initially,
b) a latency period so that the cholesteric liquid crystal molecules can relax to the planar texture, which exhibits the selective Bragg reflection,
c) a writing period during which a sequence of high and low pulses is used to modulate the cholesteric domain size and helical axis orientation, and
d) a relaxation period so that the coexistence of the planar and focal-conic textures can be stabilized.

Preferably the high and low pulses have the same pulse width but the pulse amplitudes are different from one another, the amplitude of the low pulses may be less than the threshold voltage, whereas that of the high ones may be greater than the threshold voltage. The permutation of the high and low pulses will affect directly the final domain size and helical axis orientation of the cholesteric textures, and hence the reflectivity. The root mean square voltage associated with different said permutations can be identical.

The waveform slew-rates, wherein the voltage amplitude and the pulse transition time should be restricted according to a predetermined break-even point for the optimal electro-optic and the electrical characteristics.

Preferably the bistable cholesteric display may comprise non-mesogenic dopants, which are added to the cholesteric liquid crystal mixtures to reduce the drive voltage. The non-mesogenic dopants can be chosen from the benzoyl, benzyl, phenyl, biphenyl, and triphenyl groups. Examples are benzoyl-benzene, 4-benzyl-biphenyl, diphenyl-2-pyridymethane and triphenyl-triazine.

The cholesteric liquid crystal mixtures may comprise the nematic liquid crystal mixtures and the chiral dopants. The latter has the optical rotatory power.

The driving apparatus for the bistable cholesteric displays may comprise the integrated electronic devices for the said quiescent point and the data voltages. The former is controlled by the row drivers, whereas the latter is synchronized by the column drivers to display the graphical and textual patterns. The clearing voltage is equal to half of the drive voltage in magnitude. This voltage can be generated by the said row and column drivers or the said row drivers only.

In the he writing and clearing periods, the voltage subtraction and addition are performed by the phase relationship between the signals generated by the row and column drivers. A bipolar voltage may be used wherein the root-mean-square of the data voltage can be kept at a constant value regardless of the displayed pattern.

The present invention, at least in its preferred forms, provides methods to optimize the electro-optic characteristics and electrical requirements.

1. A pulse sequence addressing for the gray-scale modulation is disclosed wherein, in contrast with the amplitude and pulse width modulation techniques, the gray-scale reflectance induced by this method does not primarily depend on the rms voltage.
2. To reduce the voltage requirement, the mesogenic dopants blended with the cholesteric liquid crystal mixtures may be provided.

BRIEF DESCRIPTION OF THE DRAWINGS

Some embodiments of the invention will now be described by way of example and with reference to the accompanying drawings, in which.

DETAILED DESCRIPTION OF THE PREFERRED EMBODIMENTS

Figure 1:
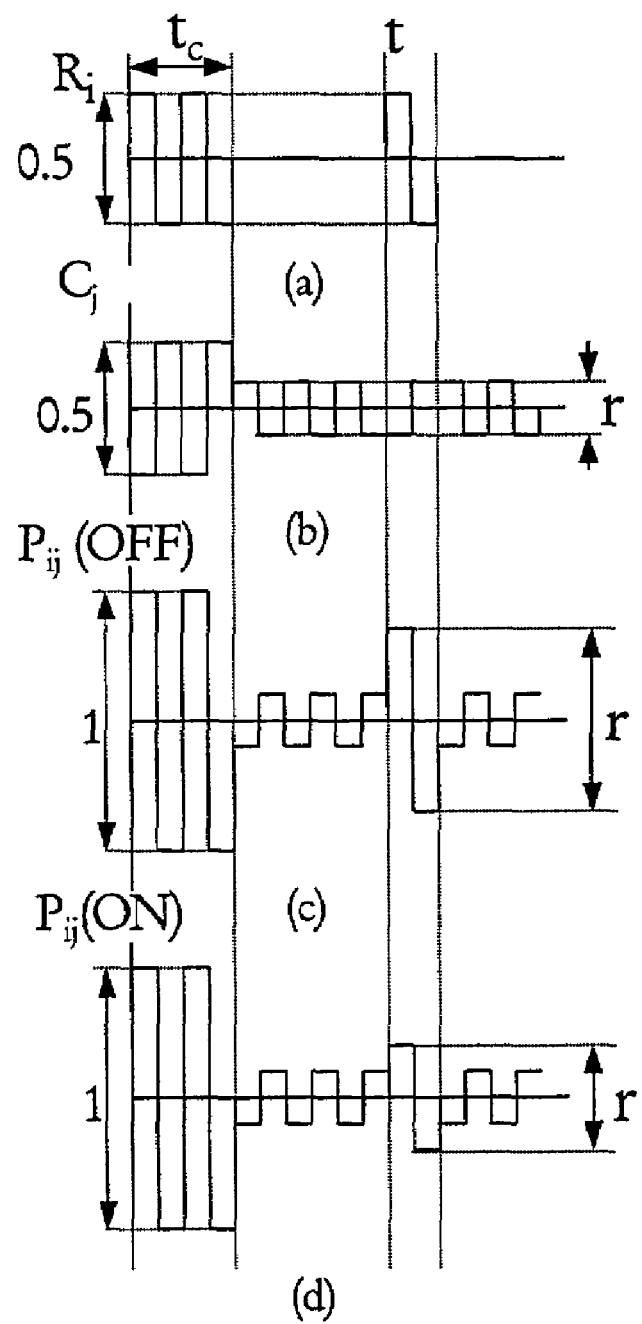
FIG. 1 shows waveforms proposed to turn on (in phase) or off (out of phase) a pixel of binary level Bistable Cholesteric Display (BCD)

1. Cost-effective Driving Scheme Making Use of Voltage Subtraction and Addition 1.1 Driving Scheme for Binary Level BCD In preferred embodiments of this invention, the rule to address BCD is to clear-before-write the data. The clearing time is denoted by $t_c$ while the writing time is $t_w$. To generalize the discussion, the peak voltage of either row or column is set to 0.5 so that the voltage across a pixel can be 1 during $t_c$. With respect to the row voltage, the data voltage for the planar to focal-conic state transition (OFF) is 180° out of phase during $t_w$. Whereas they are in phase to maintain the planar state (ON). In other words, the phase relation is used for the voltage addition or subtraction. Since it is first cleared, there is always a growing planar state at the beginning of each addressing cycle after $t_c$, in comparison with others that it can happen at the last row of the display. The pipeline algorithm is commonly used to minimize this shortcoming. The waveforms to turn on or off a pixel are depicted in FIG. 1, where $R_i$, $C_j$ and $P_{ij}$ are the ith row, jth column and (i, j) pixel respectively. Therefore, the voltages for both states are given by the following equation $$r_F = 0.5 + r$$

$$r_P = 0.5 - r \tag{1}$$

Where the suffix represents the planar or focal-conic state and r denotes the data voltage. All voltages are quoted in the peak-to-peak value and are normalized with respect to the drive voltage. The choice of 0.5 for the row voltage is primarily due to the simplification in the row driver design and will be tested for a certain $t_w$. Other factors that determine the electro-optic characteristics are $t_c$, r and $t_w$ and will be discussed in the next section. Since the pixel voltage in this scheme is controlled by the phase relationship of data voltage, its rms value is almost a constant regardless of the displayed pattern. Consequently, the problem associated with the indeterministic rms data voltage in our previous publications can be solved. In addition, the clearing voltage can be provided by a single row driver since only the out of phase condition is to meet at the row and column during $t_c$. It thus minimizes the non-standard cells fabricated on the same IC die and any parasitic couplings caused.

Figure 2:
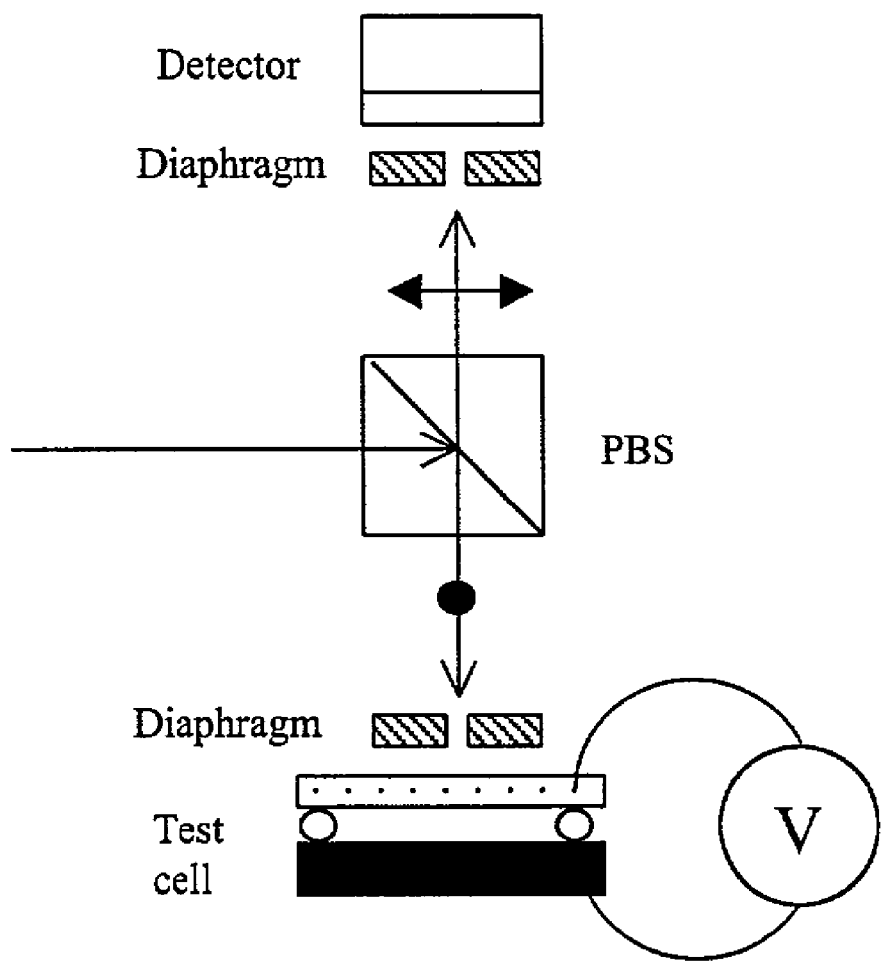
FIG. 2 shows an experimental setup for the measurements of the reflectance and dynamic responses.

For the measurement discussed in sections 1 and 2, a batch of test cells was fabricated in our laboratory. Unrubbed polyimide PIA3744 from Chisso Corp. was coated on the Indium Tin Oxide (ITO) glass surface and the low-cost nematic mixture DLC-42121 from Dainippon Ink & Chemicals Inc. was used. The cell gap was about 4 μm and the cell reflected the 543.5 nm laser light. To reduce the Fresnel reflections, the electro-optic characteristics were measured in a cross-polarization setup [see FIG. 2]. The p-wave was reflected by the polarized beam splitter (PBS) and incident normal to the test cell. The s-wave of the circularly polarized light reflected from the cholesteric helical structures was transmitted and detected by a silicon photo-detector. Voltage signal can be acquired and integrated real-time by the Hewlett-Packard Infinium Oscilloscope. Hence the electrical, the optical and the dynamic responses can be measured directly.

1.2 Effect of $t_c$, r and $t_w$

A waveform similar to that in FIG. 1b with the clearing voltage set to 1 instead was applied to the test cell. The average reflectance was measured and it showed a strong dependence on the clearing time (FIG. 2a). The drive voltage to achieve an attainable reflectance for $t_c$=20 ms was about 30 Vp. The shift in the on-set of reflectance was due to the rms requirement to deform the liquid crystal molecules homeotropically. The downfall on the high voltage side was caused by the increasing influence of data voltage at the signal floor. This trend also happened in the following measurements. To show a good indication of the final reflectance, the average reflectance <R> in this section was defined as $$\frac{\delta\lambda}{\lambda} = \frac{\Delta n}{\langle n \rangle} \tag{2}$$

Where the period T equal to one second was used in the calculation.

In FIG. 2b, the effect of data voltage r was studied for two different clearing times. Lower data voltage led to higher reflectance but less control in state selection [see eq. (1)], and vice versa. We chose to work close to r=0.14 since it depended on the threshold of planar to focal-conic state transition. This dependence is a characteristic of upsetting the regular helical axis orientation in the planar cholesterics, and it does not vary much for typical TN/STN mixtures. Therefore 20 ms clearing time is sufficient at the drive voltage of 34 Vp.

Figure 3:
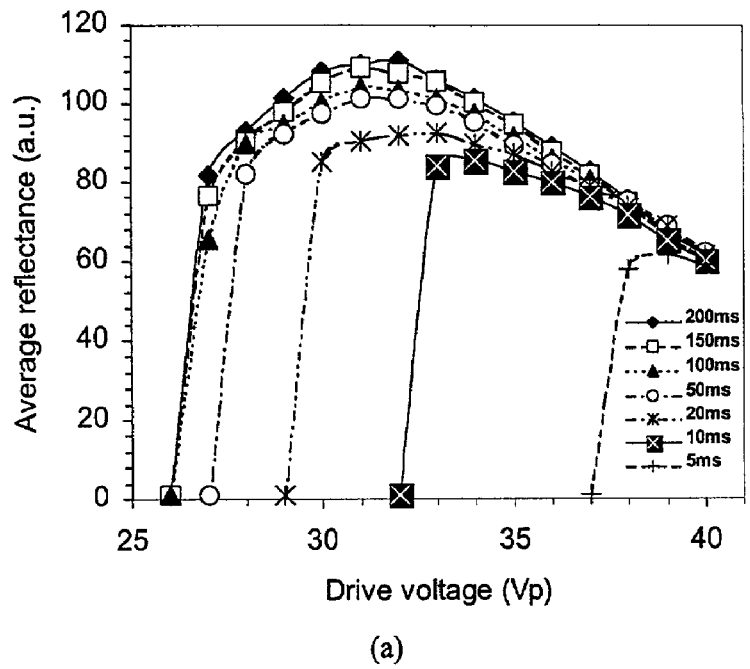
FIG. 3 shows average reflectance (a) at different clearing time $t_c$ with r=0.14, and (b) at different data voltage r with $t_c$=20 ms and 50 ms, in both cases, the frequency is 1 kHz and the period of measurement is 1 s.
Figure 3:
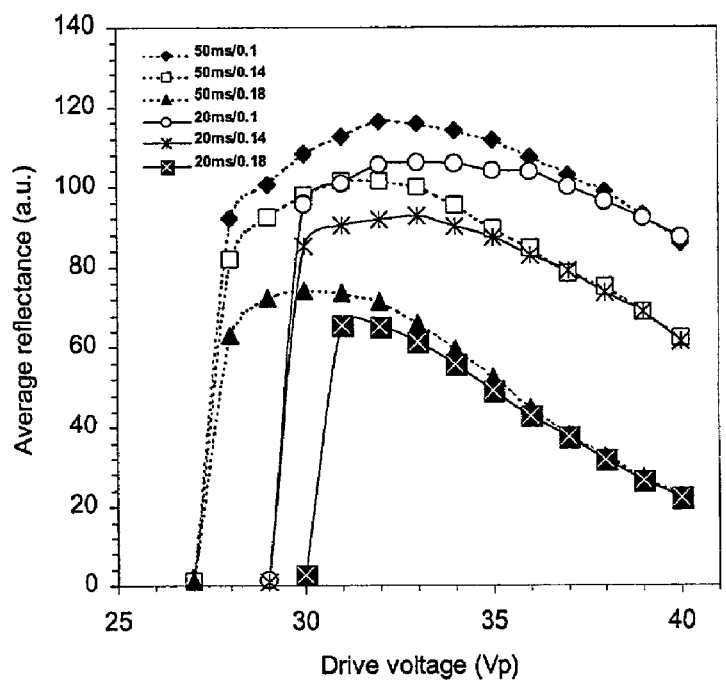

On applying bipolar pulses of duration $t_w$ to the cell, the corresponding hysteresis of reflectance was plotted in FIG. 3. The black and white symbols represented the incremental and decremental cycles respectively. The frequency of pulses was 1 kHz and the period was one second. There was also about one second delay between the bipolar pulses and the reflectance measurement. To initialize to the same reflectance at zero voltage, a large ac voltage of 1 kHz was applied between the successive series of measurements. On the high voltage side, the reflectance was lower than the initial value and it decreased as the pulse amplitude increased. This could be understood as the non-negligible shear flow effect occurred at the high field. It would alter the final helical axis distribution and hence the reflectance. Nevertheless, this high field pulses could be used for the gray-level control. On the low voltage side, the peak due to well-aligned helical domains shifted right as the duration $t_w$ became shorter. The quiescent point where the reflectance was about half the initial value also changed in the same fashion. It was clear that such shift was not linear as the writing time became shorter, even there was no influence due to the floor voltage. The ultimate choice of addressing time would thus be determined by this voltage shift and be constrained by the maximum allowable supply voltage. For $t_w$=4 ms, this quiescent point occurred at about 25 Vp which corresponded to 0.735 at the drive voltage equal to 34 Vp. It was nearly 50% more than the value 0.5 proposed in section 2. However, with the aids of the data voltage r=0.14, which was close to the planar to focal-conic transition threshold at the above drive voltage, we were able to demonstrate this operation in the next part.

1.3 Dynamic Response

Figure 4:
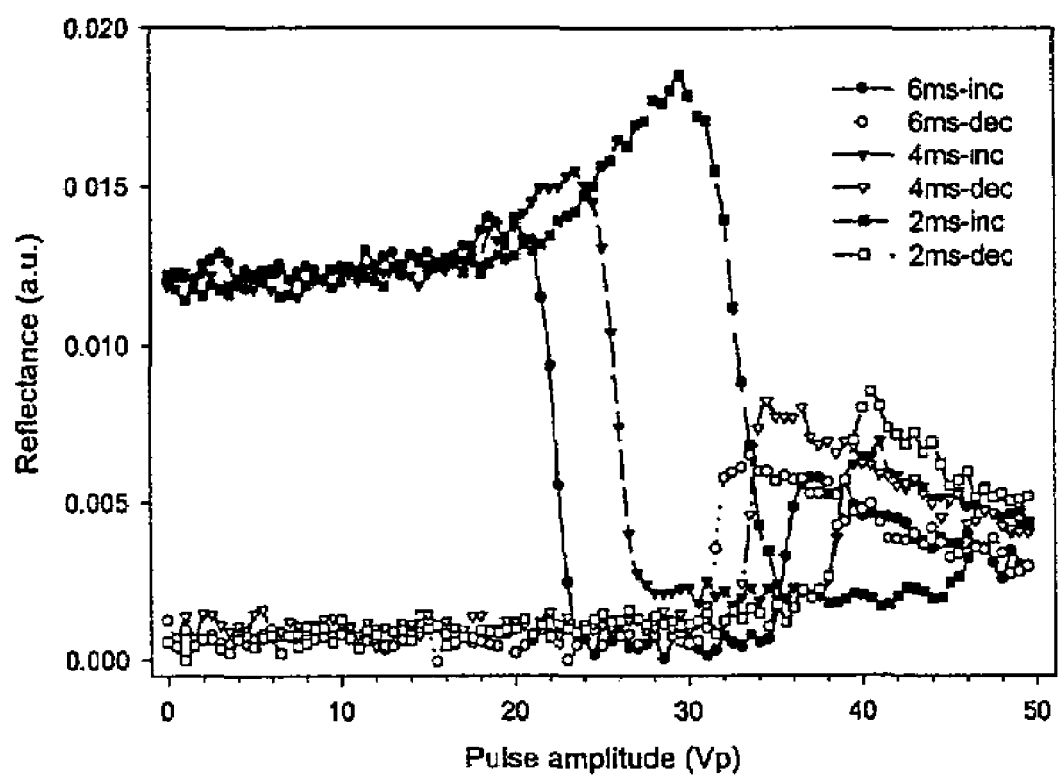
FIG. 4 shows reflectance against pulse amplitude at different writing time, the incremental and decremental voltages are denoted by inc and dec respectively, while the period and the delay before measurement are 1 s while the frequency is 1 kHz.

As mentioned in section 1.1, once r was determined the other voltages would be fixed according to eq. (1). Thus $r_F$=0.64, $r_P$=0.36 and r=0.14 were used in the following measurements. In FIG. 4, the reflectance and contrast were measured dynamically [see FIG. 5 as well]. During each period of 1 second, the reflectance was determined as the steady response at the planar state. Meanwhile together with the response at the focal-conic state, the contrast was calculated. The choice of 2 ms resulted in a nearly unchange in the reflectance, whereas that of 6 ms showed a higher contrast ratio. Compromised reflectance and contrast occurred at 34 Vp and $t_w$=4 ms.

Figure 5:
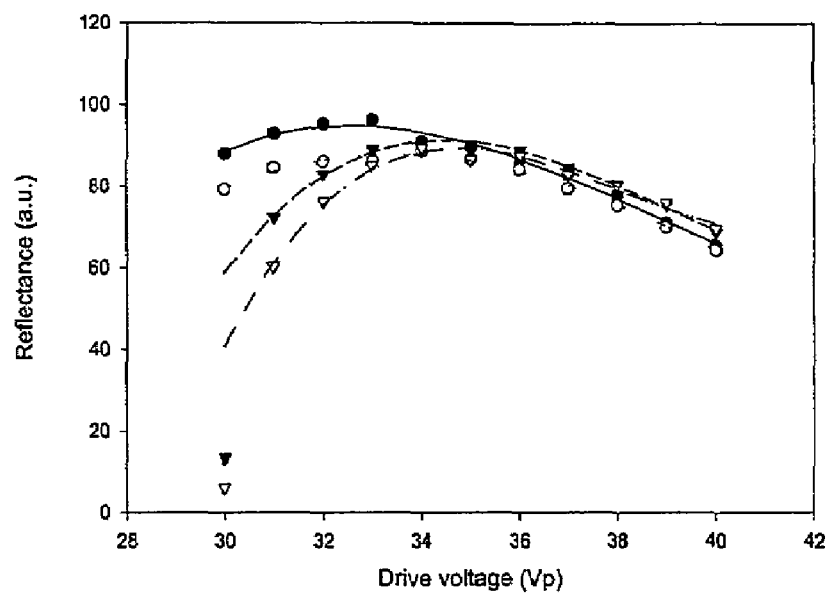
FIG. 5 shows (a) reflectance measured as the steady response at the planar state and (b) contrast calculated using the steady responses at the planar and focal-conic states, in both cases, 20 ms clearing time, 0.14 data voltage and 1 kHz frequency are used, and all plots vary with different writing time: 1 ms (solid circle), 2 ms (hollow circle), 4 ms (solid triangle) and 6 ms (hollow triangle)
Figure 5:
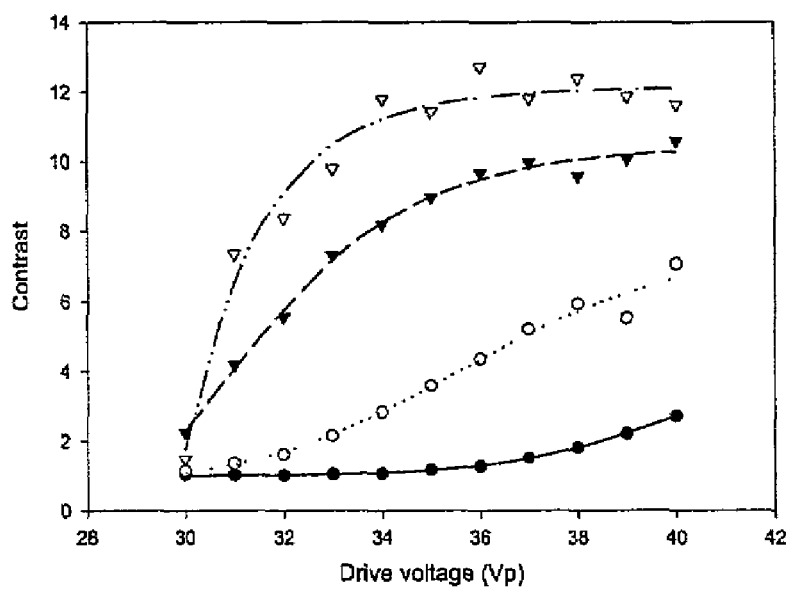

The dynamic responses based on our scheme were shown in FIG. 5. It was noted that due to the low sampling rate, only the envelope of the waveform proposed in previous section was shown. The input waveform for 2 ms case was not plotted for clarity. Higher drive voltage of 37 Vp was necessary to obtain satisfactory contrast and reflectance when $t_w$ was reduced from 4 ms to 2 ms. Further development in optimizing the liquid crystal response should bring closer the electro-optic performance between 2 ms/line and 4 ms/line addressing. Choosing the later was based on the material cost and electrical requirement arguments. To display a text of a thousand lines per second, we may combine 2 ms/line addressing and the dual scan technique. Addressing time shorter than 1 ms is bounded by more than 20% increase in drive voltage, and according to our studies in the current and power requirements, short pulses are to add cost to the fabrication processes and reliability issues. Like other schemes, there is also a noticeable change in the reflectance at the beginning of each addressing cycle. This shortcoming is intrinsic if the homeotropic state is intermediate between the state transitions.

By means of this simple scheme the drive voltage can be shared in half by the row and column drivers or the row driver only. This already divides the maximum output current into equal halves that relaxed the current requirement. Best electro-optic characteristics could be obtained for 4 ms/line addressing using the low-end mixtures.

2. Effects of Waveform Skew-rate 2.1 Circuit Model

Figure 7:
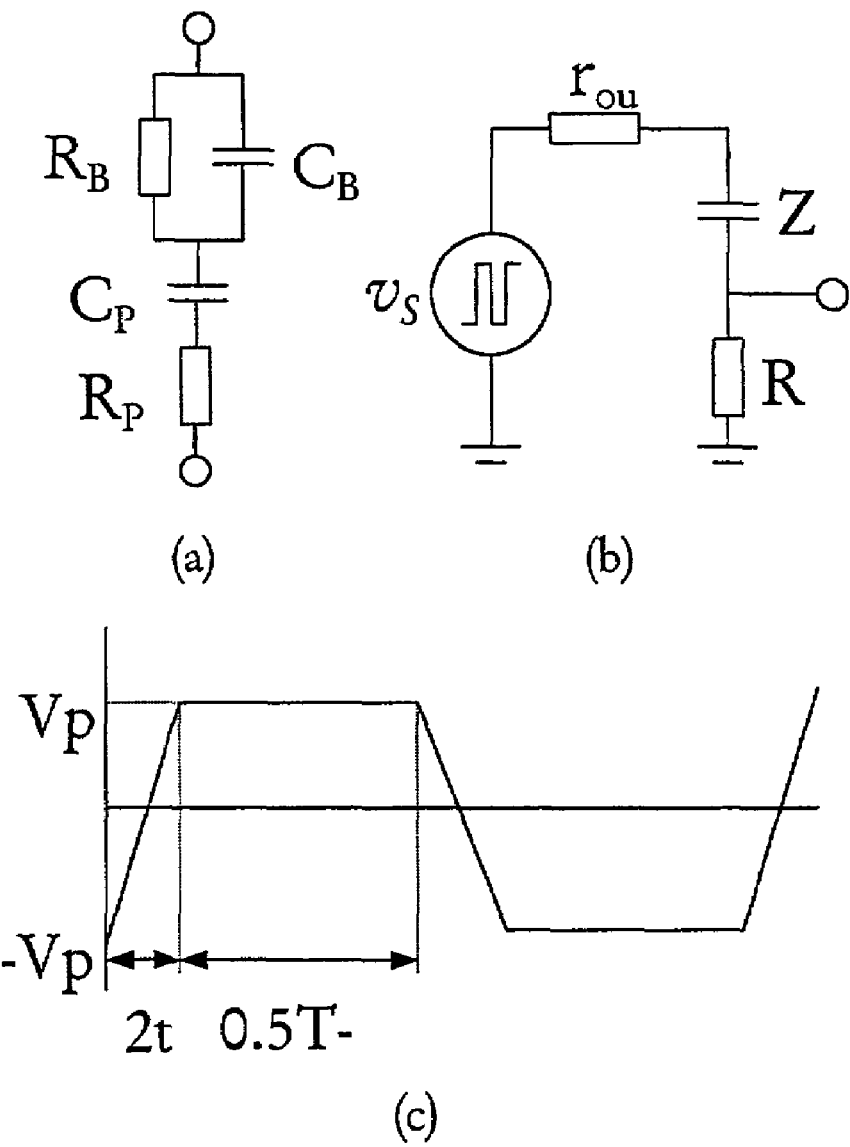
FIG. 7 shows (a) equivalent circuit model of BCD used to calculate $i_{max}$, $<p_{out}>$ and $p_{max}$, $C_B$ and $R_B$ are the bulk capacitance and resistance respectively, whereas $C_P$ and $R_P$ are those for the polyimide alignment layers, (b) circuit diagram for the measurement of $i_{max}$, $<p_{out}>$ and $p_{max}$, (c) trapezoid waveform for the slew-rate control.

Since the resistivity of the chiral dopants is usually much larger than that of typical nematic mixtures, a simple equivalent model is described in FIG. 7(a). It consists of a bulk capacitance $C_B$, a bulk resistance $R_B$ and those for the polyimide alignment layers $C_P$ and $R_P$. The electrode resistance is neglected in this study. Generally, $R_B$ is many times larger in comparison with the reactance of $C_B$ at a typical operation frequency of 1 kHz. This difference in ratio is equal to the product of the bulk resistivity, the bulk permittivity and the angular frequency, and does not depend on the dimensions of the liquid crystal cell. It usually varies from tens to thousands times when the different liquid crystal mixture (Twist Nematic, Super Twist Nematic and Active-matrix) is used. Therefore, the bulk resistance is considered insignificant compared to the bulk reactance in the following computations and this approximation will be justified in section 2.4. In FIG. 7(b), the circuit diagram for the current and power measurement is depicted. A resistor R of 1 kΩ is connected in series with the cell so that the in-phase current with the source voltage $v_s$ can be measured directly, $r_{out}$ is the output resistance of the waveform synthesizer and the trapezoid waveform of controllable slew-rate is synthesized to study the electrical characteristics. In FIG. 7(c), $V_p$ is the peak voltage, $t_1$ is half of the rising edge transition time and T is the period.

Base on the circuit theory, an approximation on the bulk resistance is used to derive the differential equation of the electrical charge. In this simplification, the functional dependence becomes apparent and the basic forms are similar to those in the Appendix. It is further assumed that the full-charge condition at which the period is sufficiently long compared with the electrical time constant of the display cell.

Therefore, the maximum output current, average and maximum output power during each voltage transition can be readily obtained as follows.

$$i_{max} = SC(1-e^{-2/s}) \tag{3}$$

$$\langle p_{out} \rangle = V_P SC \left( \frac{\tau}{0.5T} \right) \{2 - s + se^{-2/s}\} \tag{4a}$$

$$p_{max} = V_P SC(1-e^{-2/s}) \tag{4b}$$

where the slew-rate, the effective capacitance, the time-constant and the reduced slew-rate are respectively given by $$S = \frac{V_P}{t_1} \tag{5a}$$

$$C = \frac{C_B C_P}{C_B + C_P} \tag{5b}$$

$$\tau = (R + R_P)C \tag{5c}$$

$$s = \frac{\tau}{t_1} \tag{5d}$$

Thus, $i_{max}$ is proportional to the SC product. Whereas $\langle p_{out} \rangle$ depends on the SC product, the peak voltage and the ratio of time constant to half period, In addition, $p_{max}$ shows a similar dependence. Reduction in the SC product will result in a downscale in these cases. However, further reduction in the slew-rate S will affect the dynamic optical response and an optimal condition exists for the efficient implementation.

The change in the slew-rate will accompany a change in the root-mean-square (rms) voltage, and for the constant rms the new peak voltage $V_P$ relates the rectangular voltage amplitude $V_{P0}$ according to $$V_P = V_{P0} \sqrt{\frac{1+2x}{1+2x/3}} \tag{6a}$$

where the duration ratio of the rising edge to the steady state is $$x = \frac{t_1}{0.5T - 2t_1} \tag{6b}$$

When x is equal to ⅛, less than 8% increase in peak voltage is required to keep the rms constant.

In term of the slew-rate, eq (6a) can be expressed as $$V_P = V_{P0} \sqrt{\frac{(T/2V_{P0})S}{(T/2V_{P0})S - 4/3}} \tag{7}$$

This equation explicitly relates the voltage dependence with the slew-rate, which is central in the determination of the electrical characteristics.

To deduce the voltage increase associated with the different writing time, an implicit relation relative to a reference case is obtained below using eq. (6a).

$$\frac{y^3}{b} - \frac{3}{8}\frac{t'_w}{t_1}y^2 + \frac{3}{8}\frac{t_w}{t_1} - 1 = 0 \tag{8}$$

where $t_w$ and $t_1$ are the writing time and the half transition time of the reference. $t_w$=4 ms and $t_1$=0.2 ms are chosen so that b denotes the multiples of the slew-rate at 0.175V/µs. The prime signifies the parameters in the increased voltage case, and the voltage ratio is $$y = \frac{V'_p}{V_p} \tag{9}$$

In other words, eq. (8) will indicate the voltage increase when the 2 ms/line and the 4 ms/line addressing are compared at the same slew-rate for example.

2.2 Electrical Characteristics

The voltage across the resistor was monitored and the corresponding output currents at the different slew-rate were shown in FIG. 8(a). At the slew-rate below 0.7V/µs, the maximum current became flat and it decreased gradually on further reduction in the slew-rate. The discharging began to decay when the voltage was at the beginning of the rising edge transition. Whereas the charging happened to grow at the end of the rising edge transition. In FIG. 8(b), the maximum output current was obtained alongside with the theoretical plots using eq. (3). Measurements at the homeotropic and the focal-conic states were performed since the associated capacitances were different. The cell was also initialized to the planar state before the controlled waveform was applied to switch it to the homeotropic or the focal-conic state. At the slow slew-rate, $i_{max}$ was independent of resistance $R+R_P$ and the currents at the two states became comparable. At the fast slew-rate, the exponential term would diminish and the current would essentially depend on the SC product. Hence, to operate below 1 mA/cm$^2$, the slew-rate should be less than 0.175V/µs.

Figure 8:
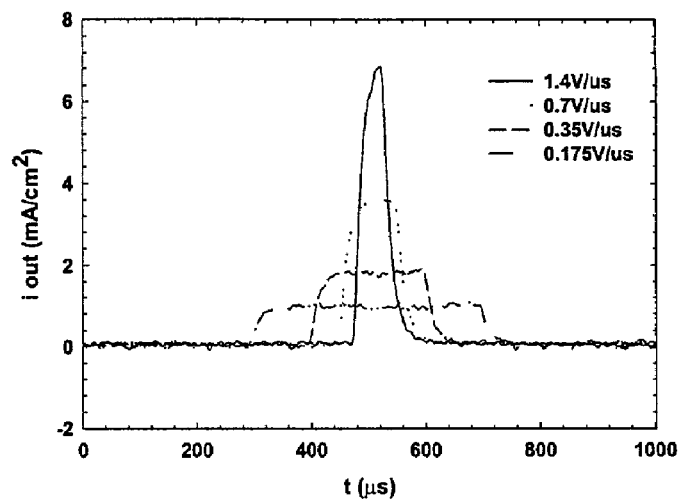
FIG. 8 shows (a) output current as a function of time and (b) maximum output current against slew-rate during the rising edge transition, the frequency of the trapezoid waveform is 100 Hz.
Figure 8:
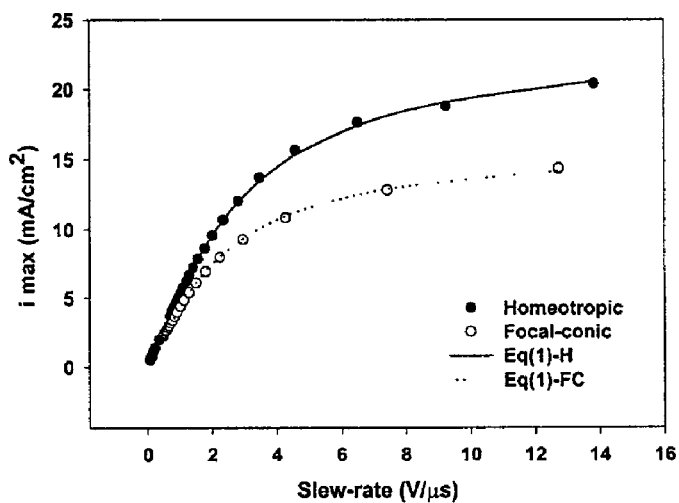
Figure 9:
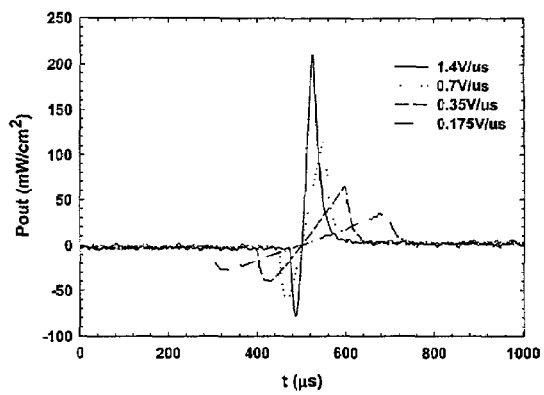
FIG. 9 shows (a) output power as a function of time, (b) average and (c) maximum output power against slew-rate during the rising edge transition, the frequency of the trapezoid waveform is 100 Hz.
Figure 9:
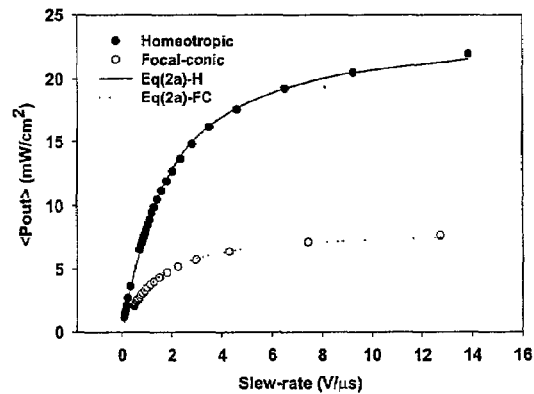
Figure 9:
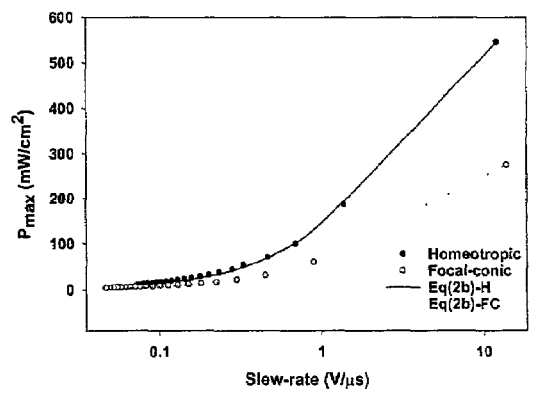

The product of output current and voltage was measured simultaneously and the corresponding power was shown in FIG. 9(a). The peak power occurred close to the point when the voltage reached the constant amplitude and operating at the high peak power could cause the reliability problems. When the slew-rate was reduced to 0.175V/µs, the output power showed a more symmetrical dependence about the time axis. Consequently, the average power could be levelled to a lower value. In FIG. 9(b) and 9(c), the theoretical curves were also plotted using eq. (8a) and eq. (8b) respectively. At the slow slew-rate, the linear dependence of average and peak power on the slew-rate was obvious and the reduction in the peak voltage in these cases could lessen the power consumption linearly. Along this trend, the average or peak power at both states also converged though the operation involved less homeotropic transitions was an advantage in general. In FIG. 8 or 9, the agreement was so good that the approximation could be justified and the conduction mechanism was dominated by the displacement current. All these findings may be incorporated into a driving scheme to study the dynamic optical response.

2.3 Dynamic Response

Figure 6:
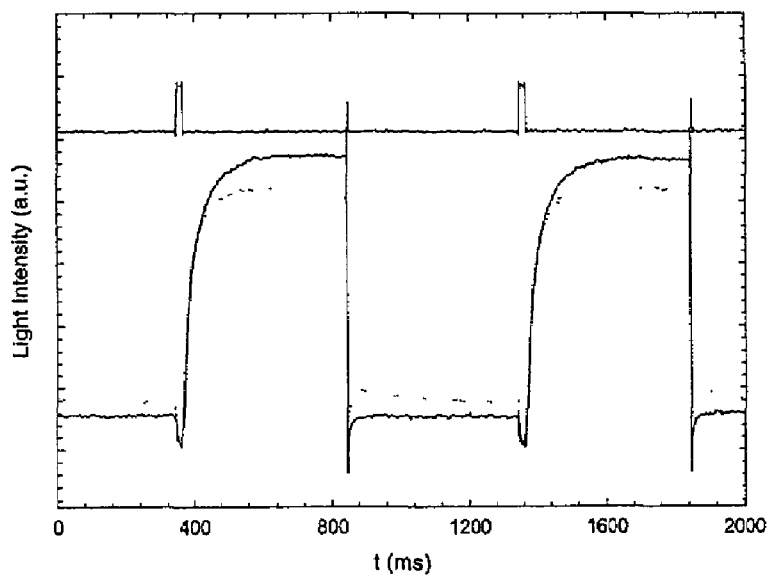
FIG. 6 shows dynamic response of the reflectance (a) when the focal-conic state (OFF) is addressed and (b) when the planar state (ON) is maintained, the solid and dotted lines represent $t_w$=4 ms and $t_w$=2 ms respectively and the drive voltages are 34 Vpeak and 37 Vpeak, in both cases, 20 ms clearing time, 0.14 data voltage and 1 kHz frequency are used.
Figure 6:
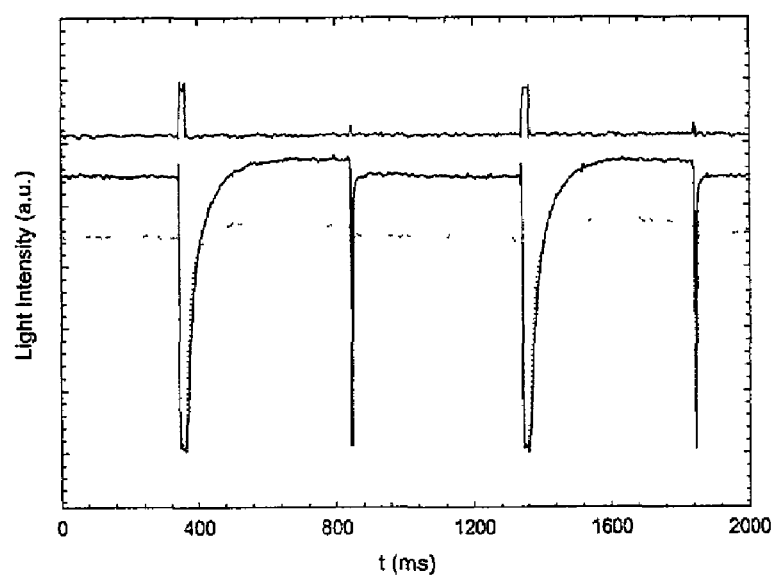
Figure 10:
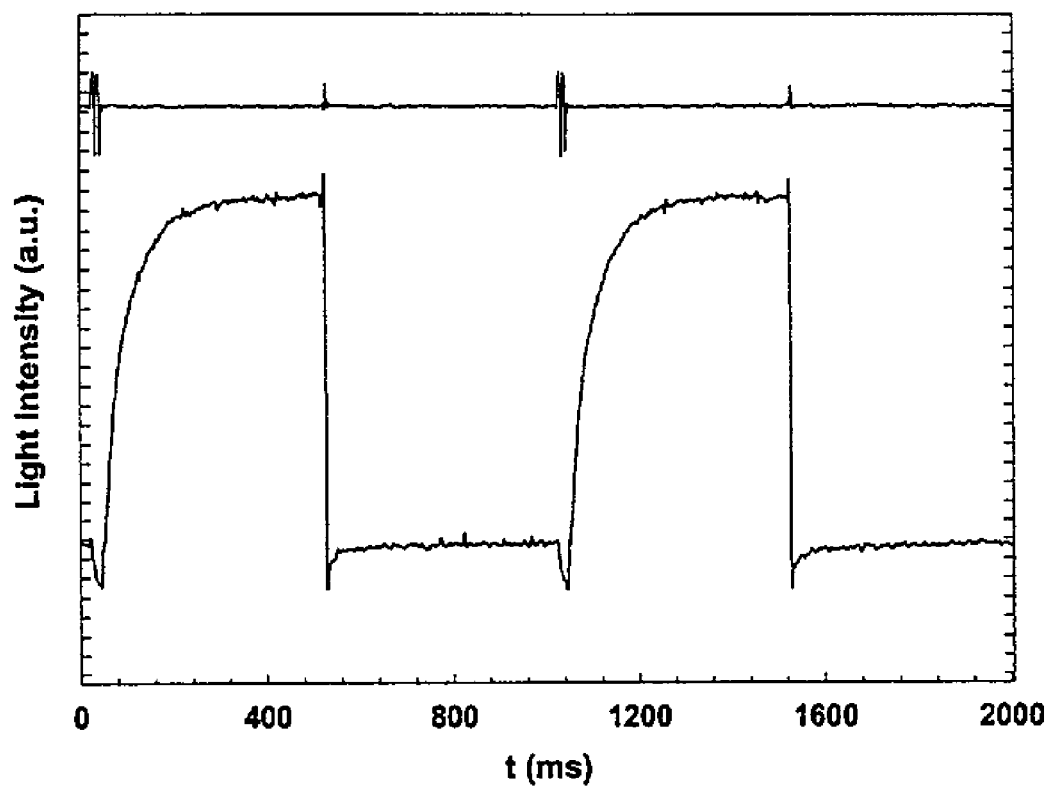
FIG. 10 shows dynamic response based on our driving scheme with the slew-rate during the clearing time equal to about 0.175V/µs, the drive voltage, clearing and writing times are 37 Vpeak, 100 Hz and 1 kHz respectively.

Due to the memory limitations in the waveform synthesis, the trapezoid waveform was implemented only during the clearing time. The slew-rate was about 0.175V/µs and the frequency was 100 Hz. For the consistent discussion, the signal voltages are normalized relative to the drive voltage and the peak-to-peak value was quoted. 4 ms writing time, 1 kHz data frequency, 0.64 focal-conic transition voltage and 0.14 data voltage are used which were the same as in section 1. These were the parameters that gave rise to the good electro-optical characteristics. The dynamic response based on this scheme was shown in FIG. 10. Compared with the figure when the slew-rate was very fast [see FIG. 6], the contrast and reflectance were not affected much, but the drive voltage had to increase from 34 Vpeak to 37 Vpeak.

Figure 11:
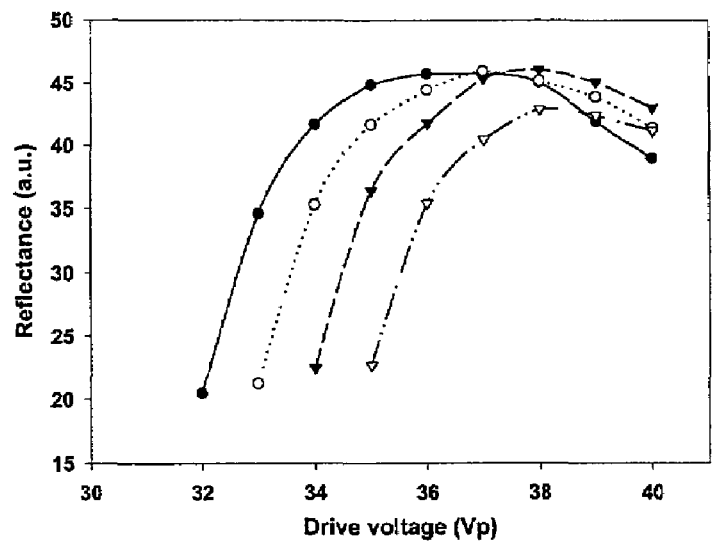
FIG. 11 shows (a) reflectance and (b) contrast at different slew-rate: 79V/ms (solid circle), 58V/ms (hollow circle), 44V/ms (solid triangle) and 35V/ms (hollow triangle), both are measured at the steady state and the waveform is trapezoid during the clearing time only, other conditions are the same as in FIG. 10.
Figure 11:
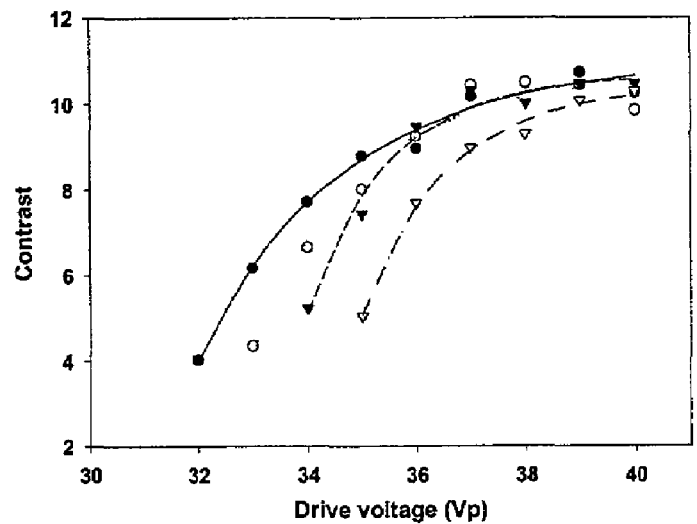
Figure 12:
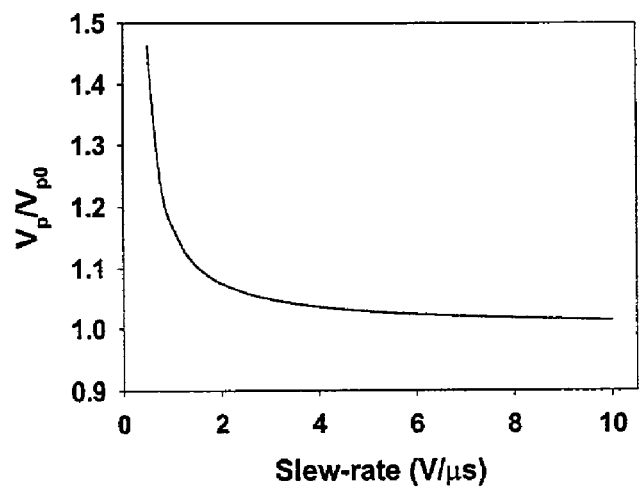
FIG. 12 shows the voltage ratio against (a) slew-rate and (b) writing time $t_w'$ at multiple slew-rates, for the latter case, all curves are referenced to the 4 ms/line addressing where $t_w$=4 ms and $t_f$=0.2 ms and are plotted at 4 times (long-dash), 3 times (dash), 2 times (dot) and 1 time (solid) the slew-rate equal to about 0.175V/µs.
Figure 12:
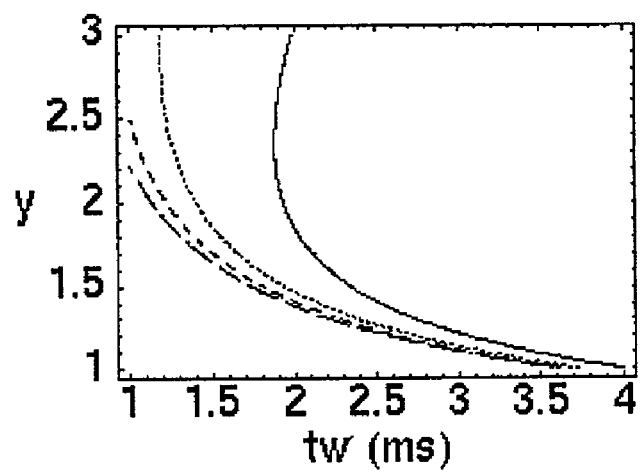

In fact, if the slew-rate became lower than this value, the on-set of reflectance and contrast would shift to the high voltage side [FIG. 11]. This was due to the constant energy requirement and the voltage dependence on the slew-rate was shown in FIG. 12(a). If the slew-rate reduces, the peak voltage will have to increase to keep the energy constant. By comparing FIG. 8(b), FIG. 9(b) and FIG. 9(c) with FIG. 12(a), there will be a crossover to balance evenly the electrical characteristics. In these cases, the rectangular voltage $V_{P0}$ in eq. (7) is the lower bound drive voltage, which is determined by the optimal electro-optic responses. Therefore, the break-even point of the slew-rate occurs at about 0.175V/µs. This optimal slew-rate is obtained experimentally, and it is possible to deduce it by solving eq. (3), eq. (4) and eq. (7). In turn, it will set a constraint on the minimum addressing time per line or the maximum drive voltage.

To compare the increase in the drive voltage, the 4 ms/line addressing is chosen as the reference case. The results were shown in FIG. 8(b). It was noted that as the period $t_w'$ was reduced below the total transition time $4t_1$, the waveform became triangular and its rms would be misleading on further increase in the voltage. The variation of voltage ratio as $t_w'$ changed from 1 ms to 4 ms is plotted to ensure the proper display scale and physical representation. The solid curve represented the voltage variation at the slew-rate equal to the reference (about 0.175V/ps) and other curves were shown at the multiples of this value. If the slew-rate is relaxed to 0.35V/µs (dot), the percentage increase for the 2 ms/line addressing compared with the 4 ms/line addressing at the reference slew-rate (solid) is about 50%, and $i_{max}$ and $<p_{out}>$ will become 2 mA/cm$^2$ and 3.6 mW/cm$^2$ respectively. Consequently, addressing at the 2 ms/line will add a high cost compared with the 4 ms/line case. In addition, if it is to operate at the 1 ms/line addressing, the percentage increase will be double even the slew-rate is relaxed to 0.7V/µs. Therefore, it will be very costly to operate with the short and rapid pulses, since the maximum drive voltage and the power consumption are the key issues for the portable applications.

2.4 Second Order Approximation

Since the display cell is modelled by the simple circuit elements, the results in this section can be applied for the cholesteric and nematic liquid crystal displays. Now, by taking Laplace transform, we have derived the current without making any approximation and assumption.

$$i(t) = SC_P(1 - \gamma(t)e^{-t/\tau}) \quad (0 \le t < 2t_1) \tag{10}$$

$$i(t) = \tag{11}$$
$$SC_P(1 - \gamma(2t_1)e^{-2t_1/\tau})\frac{\cosh[\Omega(t - 2t_1) + \beta]}{\cosh\beta}e^{-(t-2t_1)/\tau} \quad \left(2t_1 \le t < \frac{T}{2}\right)$$

where the parametric functions are given by $$\gamma(t) = \sqrt{1-\lambda^2}\cosh(\Omega t + \alpha) + \frac{t_1}{\tau_1}\sqrt{1-\mu^2}\cosh(\Omega t + \beta) \quad (12)$$

$$\alpha = \ln\left|\frac{1+\lambda}{\sqrt{1-\lambda^2}}\right| \quad (13)$$

$$\beta = \ln\left|\frac{1+\mu}{\sqrt{1-\mu^2}}\right| \quad (14)$$

$$\lambda = \frac{1}{\Omega}\left(\frac{1}{\tau} - \frac{1}{\tau_1}\right) \quad (15)$$

$$\mu = \frac{1}{\Omega}\left(\frac{1}{\tau} - \frac{1}{\tau_e}\right) \quad (16)$$

and the time constants are expressed as $$\tau_1 = (R+R_P)C_P \quad (17)$$

$$\tau_2 = R_B C_B \quad (18)$$

$$\tau_e = (R+R_P)C \quad (19)$$

$$\tau = 2\left(\frac{\tau_2 \tau_e}{\tau_2 + \tau_e}\right) \quad (20)$$

$$\Omega^2 = \frac{1}{\tau^2} - \frac{1}{\tau_1 \tau_2} \quad (21)$$

Using eq. (17) to eq. (21), it is easy to show that $\lambda^2$ and $\mu^2$ are both less than 1. In other words, eq. (10) to eq. (14) are well-defined equations. The definitions of the slew-rate S and the effective capacitance C can also be found in section 2.1. It is noted that eq. (10) and eq. (11) are directly proportional to the capacitance of the polyimide layer $C_P$, and these findings are consistent with the publication. It is however contrary to the dependence on the effective capacitance when the approximation is made [see section 2.1]. Therefore, the approximation on the bulk resistance and the linear model are more appropriate to describe the experimental data.

Since the agreement between the experimental and the calculated results was good, it is possible to justify the approximation and verify that the major conduction and power in the BCD depended on the capacitance of the cholesteric liquid crystal. This was however not usual in the nematic liquid crystal displays. The break-even point of the slew-rate for the optimal electrical and optical characteristics was about 0.175V/μs. In this case, the maximum output current and average output power could be kept below 1 mA/cm² and 2 mW/cm² respectively. Therefore, how to optimize the electro-optic and electrical requirements is disclosed.

Figure 13:
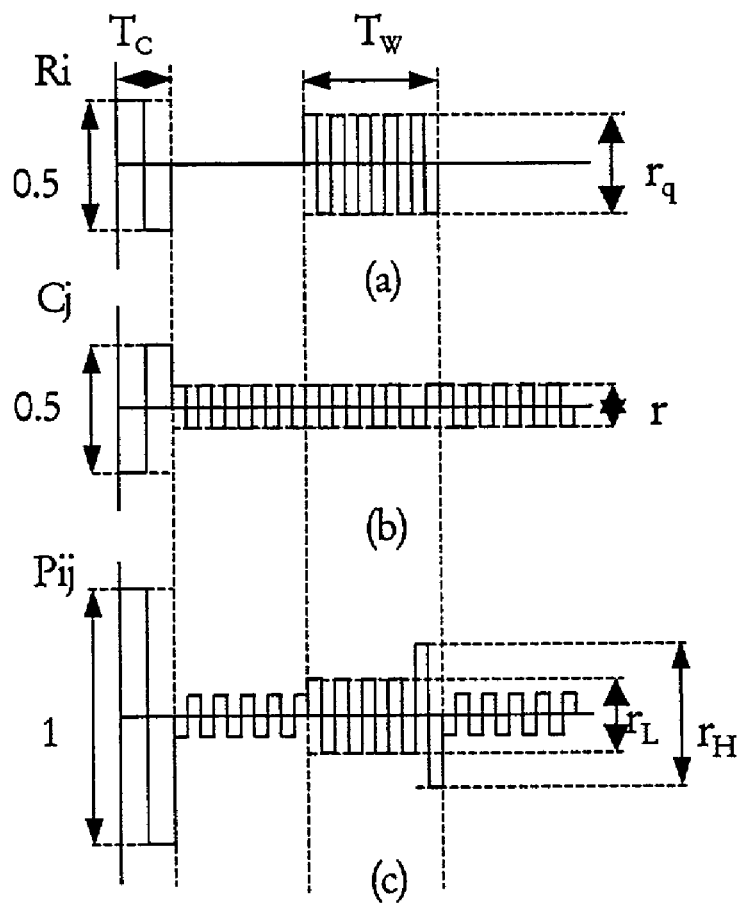
FIG. 13 shows waveforms of pulse sequence to address the gray-scale BCD.

3. Pulse Sequence Addressing Scheme for Gray-scale Modulation 3.1 Pulse Sequence Addressing Scheme The addressing waveform in section 1 is extended to include more cycles of bipolar pulses and is shown in FIG. 13. $T_w$ denotes the total writing time and $T_c$ is the clearing time. For the former, the frequency is 1 kHz and the slew-rate should be set below 0.4V/μs so that the increase in the drive voltage can be kept less than 8%. Lower frequency allows more room to reduce the slew-rate with a negligible effect on the rms voltage and 50 Hz is elected for the latter. For a coherent discussion, the voltage across a pixel $P_{ij}$ is normalized with respect to the drive voltage and all voltages are quoted in the peak-to-peak values. The voltage difference is also determined by the phase relationship between the i-th row $R_i$ and the j-th column $C_j$. The corresponding equations are given below.

$$r_H = r_q + r$$

$$r_L = r_q - r \quad (22)$$

Where the suffix represents a high or low voltage. $r_q$ and r are the quiescent point voltage and the data voltage respectively.

In this invention, we shall mainly discuss the pulse sequence addressing scheme using five high and low bipolar pulses for an 8-level gray-scale modulation. The principle is to perturb the planar cholesteric texture in the vicinity of the planar to focal-conic transition threshold. When the applied voltage exceeds the threshold, the planar cholesteric texture will break up into small domains that scatter the light. They grow in the irregular patterns and under the influence of the electric field. If a field much higher than the threshold is applied, the focal-conic texture can be grown in tens of milliseconds. In fact, the response time of this transition is very fast, which can be less than 1 ms.

Consequently, any rapid changes in voltage will directly affect the planar cholesteric texture. On the other hand, if the field is removed during the growth, the rate of transformation will die down and cease to grow after hundreds of milliseconds. It is indeed the case when the surface is treated for the planar alignment. For the homeotropically treated surfaces, the pattern formation of focal-conic texture can be completed and stabilized in less than a hundred millisecond. Therefore, in both cases, the occurrence of a growth pulse followed by the holding pulses will influence the domain size and hence the reflectivity. In addition, the dependence on frequency is negligible and the amplitude of the holding pulses should be less than the threshold. It has been found that the holding pulses are effective to promote the pattern formation of the focal-conic texture, although they can hardly induce the transformation on their own.

Two different pulse amplitudes, which correspond to the growth and holding voltages, can be chosen about the quiescent point of the state transition. For 5 encoded pulses, there will be totally 32 levels in the reflectance. When all the pulse voltages are low, the reflectance will be at the highest or the $31^{st}$ level. When there is a high voltage pulse H among four low voltage pulses L, the reflectance will be reduced and determined by the occurrence of this high voltage pulse in the sequence. In other words, the $30^{th}$ level will correspond to LLLLH, $29^{th}$ level to LLLHL and so on. This trend happens for other cases when more high voltage pulses are involved. This effect becomes less prominent and the levels are getting less far apart, when more than two high voltage pulses are encoded. Therefore, the final reflectance is a nonlinear and discrete function of these encoded pulses. Nevertheless an optimal set of the sequences exists for the 5 ms/line addressing.

To optimize the final gray-scale, $r_q$ is found equal to 0.44 at 5 ms writing time. For the binary level BCD, good contrast and brightness have been observed when $r_q$ is set equal to 0.5. Because in the latter case the dependence on the state transition characteristics is not critical, and the transient contribution due to the addressing pulses becomes less influential in the determination of the final reflectance. Taking the slew-rate into consideration, $r_q$ can be set close to 0.5 by reducing the waveform slew-rate to 0.2V/μs. Therefore, the 2-level amplitude control can be simplified to a sub-level design. The maximum output current and average power will be reduced approximately by half compared with the case at 0.4V/μs.

For the measurement discussed in this section, a batch of test cells was fabricated in our laboratory. Unrubbed polyimide PIA3744 from Chisso Corp. was coated on the Indium Tin Oxide (ITO) glass surface. Nematic mixtures MLC-6041 and chiral dopant S811 from Merck KGaA were used. The cell gap was about 4 μm and the cell reflected 543.5 nm laser light. To reduce the Fresnel reflections, the electro-optic characteristics were measured in a cross-polarization setup [see FIG. 2]. The p-wave was reflected by the polarized beam splitter (PBS) and incident normal to the test cell. The s-wave of the circularly polarized light reflected from the cholesteric helical structures was transmitted and detected by a silicon photo-detector. Voltage signal can be acquired and integrated real-time by the Hewlett-Packard Infinium Oscilloscope. Hence the reflectance and the dynamic responses can be measured accordingly. The PBS was broadband and purchased from Newport Corp.

3.2 Electro-optic Characteristics and Dynamic Response

Figure 14:
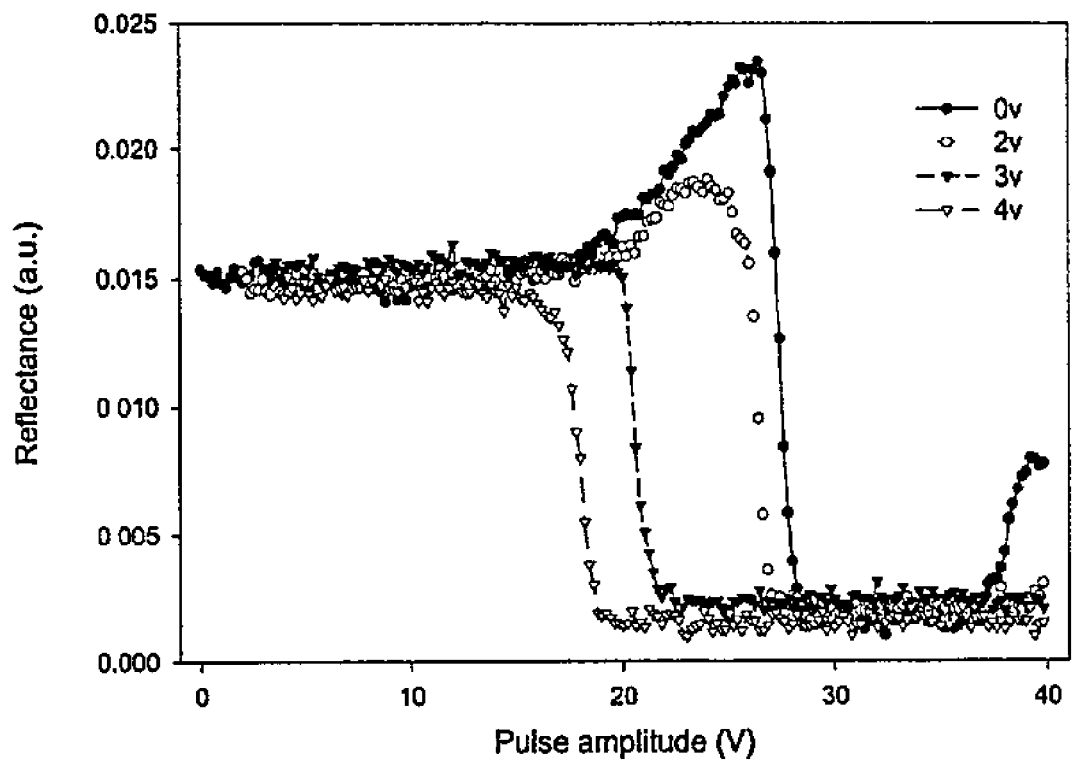
FIG. 14 shows reflectance against pulse amplitude at different signal floor voltages, the frequency of both bipolar pulse and signal floor voltage is 250 Hz, whereas the writing time is 4 ms.

A large bipolar pulse was superimposed on a periodic rectangular waveform of the same period 4 ms. The periodic rectangular waveform was used to study the effect of signal floor voltage on the planar to focal-conic transition. The reflectance was measured about 3 seconds after the pulse amplitude was incremented and was initialized to the same value between the successive series of measurements. A long delay time was allowed to make sure that there was no slow long time constant relaxation before the measurement was taken. In FIG. 14, the solid circle curve represented the pure pulse case and the signal floor voltage was zero. This characteristic was similar to those observed at different writing times. It was clear that the quiescent point $r_q$, when the signal floor voltage was 4 Vpeak, was about half of the drive voltage. For the optimal gray-scale control, $r_q$ and r were found equal to 0.44 and 0.14 respectively. The former was determined by the heuristic approaches, whereas the latter was based on the studies in sections 1 and 2. In this case, the drive voltage was 36.4 Vpeak though. Usually, high data voltage was effective to destabilize the fluctuation in the vicinity of the planar to focal-conic transition threshold, so that the levels in reflectance associated with different pulse sequences can be more far apart.

Figure 15:
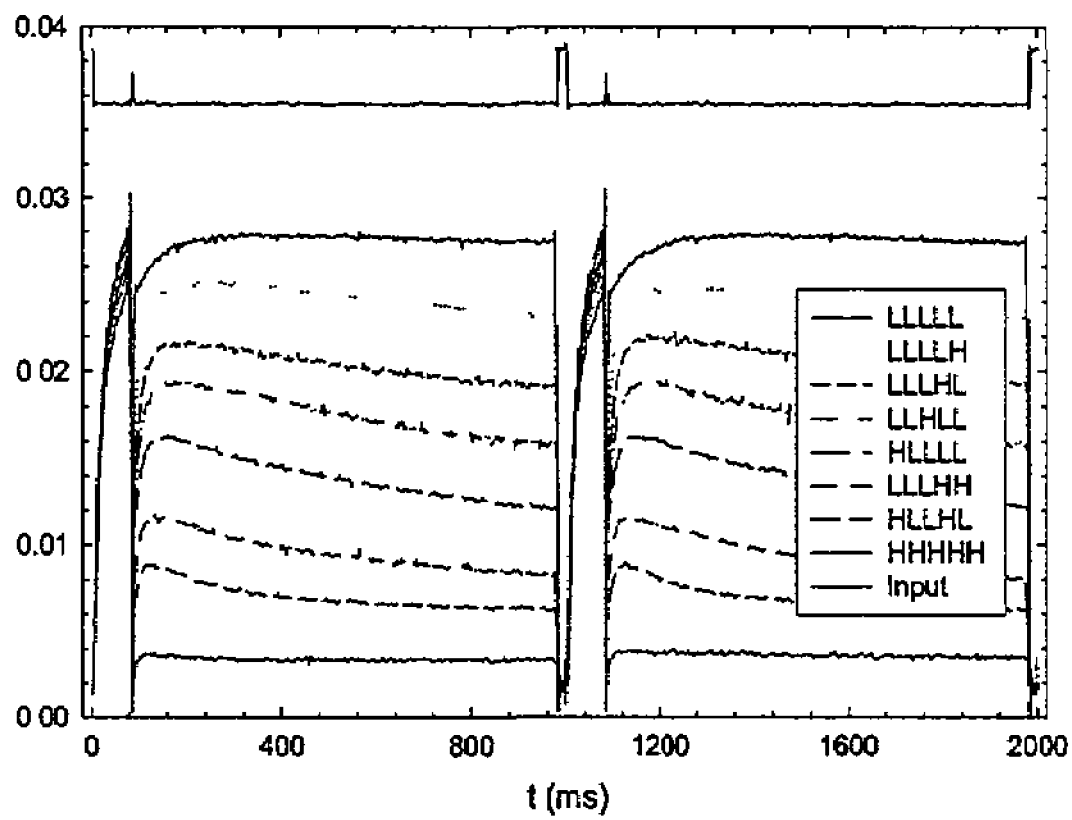
FIG. 15 shows dynamic response of gray-scale control, the writing time is 5 ms and the clearing time is 20 ms and both have the same frequency at 1 kHz, the high H, low L and data voltages are respectively 0.58, 0.3 and 0.14, and the drive voltage is 36.4 Vpeak, the vertical axis represents the intensity and it has an arbitrary unit.

In FIG. 15, the waveform of the pulse sequence addressing was designated as input and only the case of all high voltage pulses was shown for clarity. The responses from the highest to lowest reflectance were ordered in accordance with those described in the legend. H and L represented high and low pulses [see eq. (22)] and were equal to 0.58 and 0.3 respectively. In this case, the writing time, frequency and data voltage were respectively 5 ms, 1 kHz and 0.14. It is surprised that the reflectivities associated with the two sets of pulse-sequences: {LLLLH, LLLHL, LLHLL, HLLLL} and {LLLHH, HLLHL} are distinctly different from one another. Since the rms voltage associated with these pulse sequences degenerates to two different values, it is the rapid temporal responses that will matter. It is not likely due to the Carr-Helfrich effect, since the frequency dependence of the transition is not critical and the frequency spectra are similar for any set of the pulse sequences. Nevertheless, the ion segregation cannot be neglected for the liquid crystals of positive and negative dielectric anisotropies.

On the other hand, due to the long homeotropic-planar relaxation time, there was an 80 ms delay after the 20 ms clearing time. Shorter than this delay, the final reflectance would deviate from the appropriate value and it depended on the liquid crystal temporal characteristics. Again this problem was rooted in other driving schemes and it became very complex when the transitions among different gray-levels were necessary. Optimization based on this scheme was however simpler since the initial state was always the highest level planar state.

3.3 Domains Characteristics

Figure 16:
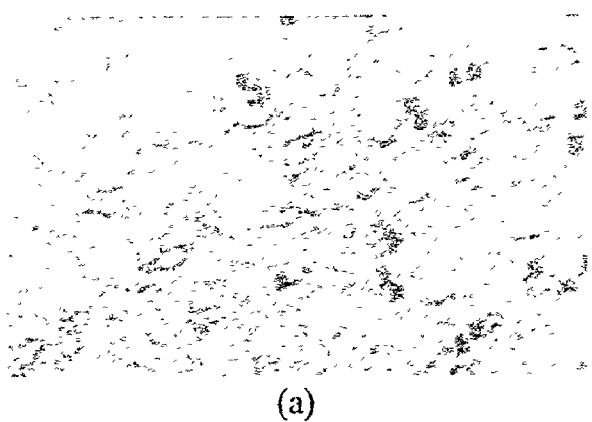
FIG. 16 shows photographs of different topological domains: (a) planar, (b) coexistence of planar and focal-conic, (c) focal-conic, the magnification is 50 and the grey round dots are the spacers.
Figure 16:
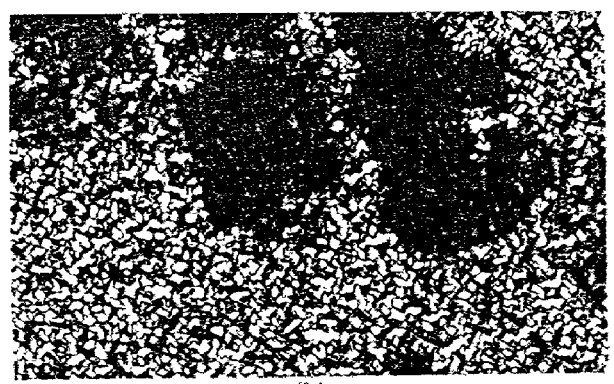
Figure 16:
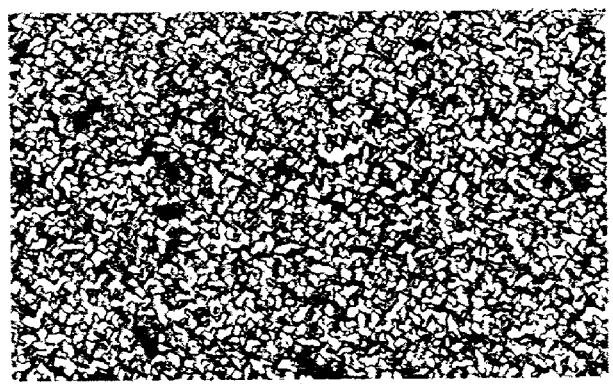

By making use of the waveforms described in the section 3.1, different topological textures were obtained in accordance with different permutation of the pulses. In FIG. 16(*a*), when all the pulse voltages were low, a planar cholesteric texture that reflected the green spectrum of the ambient light was observed. The domain boundaries of the planar texture were also visible when it was observed under the optical microscope. When all the pulse voltages were high, the texture became focal-conic [FIG. 16(*c*)]. To demonstrate the effect on the domain size-dependent reflectivity, the pulse sequence that gave rise to the mid-level in reflectance was chosen. This led to an inhomogeneous texture composed of irregular planar and focal-conic domains. The reflectivity depended on the size and the helical axis orientation of the planar cholesteric domains shown in FIG. 16(*b*). Other permutations of the pulses would cause different domain sizes and hence the reflectivity.

Based on these findings, it is believed that the temporal gradient of the velocity tensor is central in the pulse-sequence induced gray-scale reflectivity. Because the apparent bulk viscosity of a cholesteric liquid crystal may often be $10^5$ times larger than the friction coefficients defined in Leslie equations. At the low voltage threshold, the flow due to the permeation effect is negligible along the cholesteric helical axis. Above this threshold, the applied electric field will give rise to the viscous stress tensor that favours the flows orthogonal to the cholesteric helical axis. According to the hydrodynamic equations, the temporal changes in the flow gradients will couple with the stress and pressure gradient tensors that influence the final configuration of the liquid crystal director. Therefore, in the vicinity of the transition threshold, it is possible that the focal-conic domain formation and hence the gray-scale reflectivity can be induced by the rapid pulses of the same rms voltage. In addition, these flow gradients, which associate with the viscosities different by many orders, are responsible for the slow response of optical reflectivity. Consequently, there will be a slow roll-off when the planar texture has not been transformed to the focal-conic texture completely.

The electro-optic and domain characteristics of cholesteric liquid crystal had been studied in the vicinity of the planar to focal-conic transition threshold. When a train of high and low bipolar pulses was applied, it is found that the domain size of planar texture depended on the addressing sequence of the pulses. Each of these pulses should be chosen about the quiescent point of the transition. This could be attributed to the destabilization of helical axis orientation when the transition threshold was exceeded. Therefore, the occurrence of the first high pulse would trigger the planar to focal-conic transition and the final domain size would be influenced by the root-mean-square voltage associated with this pulse train. By proper permutation of such pulses, final reflectance of even difference could be useful for the gray-scale display applications. In this invention, a pulse sequence addressing for the gray-scale control is disclosed. This capability was demonstrated for an 8-level BCD in 5 ms/line addressing for the first time.

4. Voltage Reduction by Non-mesogenic Dopants

In this invention the possibility is also contemplated of reducing the unwinding voltage by partial destruction of the order parameter, which was accomplished by the use of dopants to the liquid crystal.

Helix unwinding of cholesteric liquid crystals was first studied theoretically by de Gennes and Meyer. Experiments on long-pitch cholesteric liquid crystals subsequently confirmed the predictions that the pitch diverged logarithmically at the critical field and the cholesteric-nematic phase transition was observed. The influence of the anchoring energy and the cell thickness on the helix unwinding process was also revealed in the cano-Grandjean disclination experiment. The minimization of free energy favors the nematic phase if the thickness is less than the unperturbed pitch. For the parallel-plates configuration, the unwinding actually occurs below the critical d/p ratio. Above which, the cholesteric will develop a periodic pattern or isolated fingers. At ac electric field, the problem becomes complicated since ion segregation cannot be neglected, especially for liquid crystals of negative dielectric anisotropy. The critical voltage exhibits a dispersive characteristic in the frequency domain and it is lower than the unwinding and Frederick transition voltages. It is known as the Carr-Helfrich effect, which prevails in nematic and cholesteric liquid crystals.

At the cholesteric-nematic phase transition, Baesseler et al concluded that based on Debye's theory, the phase transition was caused by the interaction between the electric field and the permanent molecular dipoles. The frequency dependence is given by:

$$E_U^2(\omega) = E_U^2(0)\left(1 + \frac{\omega^2}{\omega_r^2}\right) \tag{23}$$

where $E_U(0)$ is the rms unwinding field at zero frequency and $\omega_r$ is the dipole relaxation frequency. However contrary to Baesseler's results, the helix unwinding voltage saturates at high frequency with a smooth maximum at several hundred Hz. This characteristic cannot be simply extended by Hurault's treatment. The spectral reflectivity and the frequency dependence of unwinding field may be studied as a function of non-mesogenic dopant concentration. De Gennes's result is adapted for the electric counterpart and the corresponding dc unwinding field is given by $$E_U(0) = \frac{\pi^2}{p_0}\sqrt{\frac{4\pi k_{22}}{\Delta\varepsilon}} \tag{24}$$

where $p_0$ is the unperturbed pitch, $k_{22}$ is the twist elastic constant and $\Delta\varepsilon$ is the dielectric anisotropy. Since the space charge effects are central to the electrohydrodynamic instabilities and the helix unwinding, the following empirical relation that has the Lorentzian term is suggested to fit the experimental data.

$$V_U(\omega) = \frac{V_U(0)}{\zeta}\left(\frac{\zeta + \omega^2\tau^2}{1 + \omega^2\tau^2} + \frac{\omega\kappa}{\sqrt{1 + \omega^2\kappa^2}}\sqrt{\frac{\zeta + \omega^2\tau^2}{1 + \omega^2\tau^2}}\right) \tag{25}$$

where $\zeta$ is a dimensionless quantity and depends on the material properties of the liquid crystal mixture. Whereas $\tau$ and $\kappa$ are empirical time constants associated with the unwinding. These are consistent with the hydrodynamic relaxation of the helix unwinding at which at least two time constants are necessary for the experimental fitting. Since the pitch is independent of the order parameter, the elastic constant and dielectric anisotropy expressed in order parameter S are $$k_{22} = L_1 S^2$$

$$\Delta\varepsilon = \Delta\varepsilon_{max} S \tag{26}$$

where $L_1$ is a constant determined by Landau-de Gennes equation and $\Delta\varepsilon_{max}$ is the anisotropy at the perfect alignment stemmed from the polarizability of molecules. They do not depend on the driving ac frequency. Combining eq. (24) and (26), the dc unwinding field becomes $$E_U(0) = \frac{\pi^2}{p_0}\sqrt{\frac{4\pi L_1}{\Delta\varepsilon_{max}}}\sqrt{S} \tag{27}$$

Equations (25) and (27) are the main results that we want to confirm experimentally. In addition to being physically interesting, eq. (27) provides a means of reducing $E_U$. One can reduce the helix unwinding voltage simply by reducing the order parameter. However, the order parameter should not be reduced so much that the liquid crystal property is also destroyed. So there should be an optimal value of S.

The effect of varying order parameter on the helix unwinding voltage was studied experimentally using standard sample cells. The LC cell was made with unrubbed polyimide, which was spin-coated on ITO glass with the pretilt of about 2°. The cell gap was approximately 4 μm. The undoped cholesteric mixtures was made by dissolving 24.8 wt % of left-handed S811 chiral molecules to the nematic mixtures ZLI-6204 positive dielectric anisotropy) from Merck. Benzoyl-benzene (Benzophenone) of 99% purity was mixed with the cholesteric as the dopant.

First, the effect of the dopant on the reflectance spectrum was measured. For this measurement, the doped cholesteric cell was aligned at an oblique angle to the incident rays. Commercial xenon lamp system with good collimation and a PR650 spectrophotometer were used. The spectral data was collected at a small angle offset from the principal reflection direction. This was important in order to minimize the effect of Fresnel reflections at air-glass interfaces. The incident angle was about 10°. A high voltage pulse at 1 kHz was used to reset the samples to the planar state first. A long delay time was allowed to make sure that there was no slow long time constant relaxation before the measurement was taken.

Figure 17:
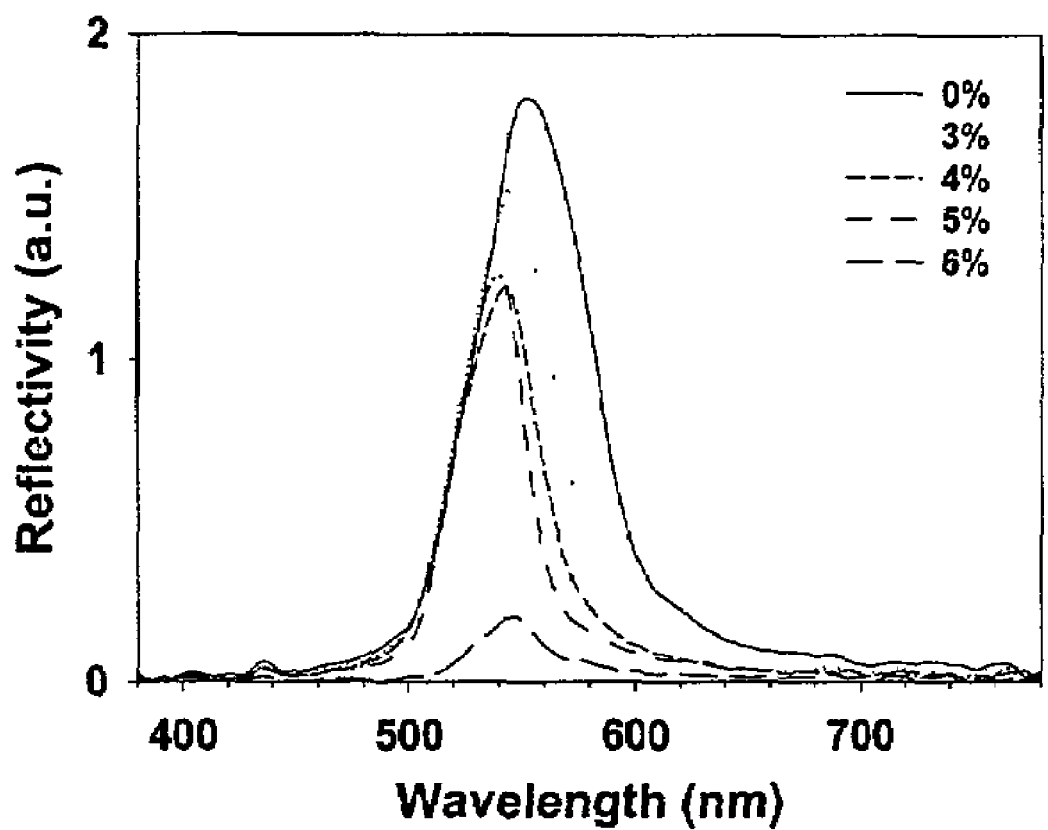
FIG. 17 shows spectral reflectivity of 4 µm-planar cholesteric doped at different concentration of benzophenone.

The results are plotted in FIG. 17. It can be seen that the reflection peak for the undoped case is at about 550 nm. This peak shifts to shorter wavelengths as the doping concentration increases. The reflectivity and FWHM spectral width are also reduced. However, at about 5% doping concentration, the reflectivity ceases to change before it drops abruptly at higher concentration. The peak at the latter case shows only a slight variation. The percentage change in the peak reflectance wavelength is given by $$\frac{\delta\lambda}{\lambda} = \frac{\Delta n}{\langle n \rangle} \tag{28}$$

where λ and <n> are the reflection peak and average refractive index respectively. This relation does riot depend on the apparent pitch.

Figure 18:
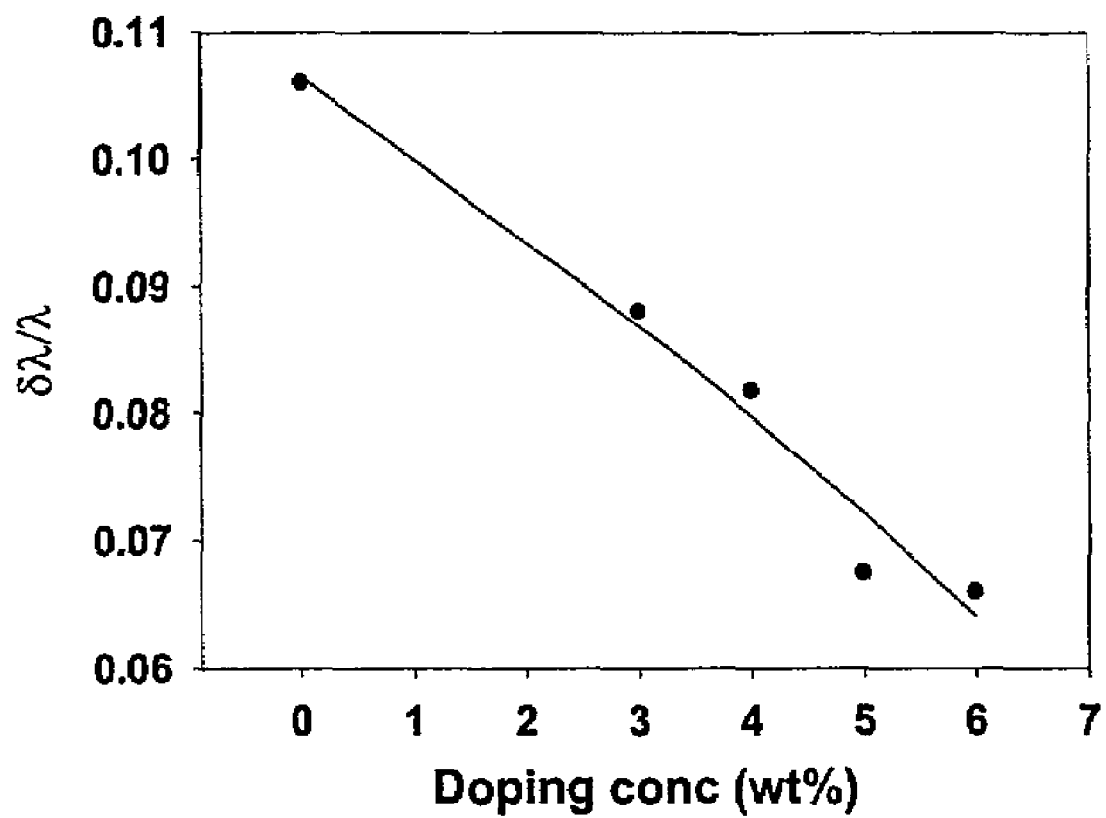
FIG. 18 shows the ratio of FWHM to reflection peak against the doping concentration of benzophenone.

FIG. 18 shows the relative spectral shift as a function of doping concentrations. A systematic trend can be observed. On the other hand, since the variations of reflectivity and reflection peak follow a similar pattern from 0 to 5%, it can be deduced that the apparent pitch actually changes with the doping concentration. This implies that the average refractive index plays a minor role in comparison with the apparent pitch. Therefore, it is a direct confirmation that the birefringence is influenced by the dopant.

The frequency dependence of the transmittance in the cross polarization geometry was also measured. A laser beam at 543.5 nm was used to monitor the transmittance every second as the ac voltage was gradually increased. The null point in transmittance was determined as the unwinding voltage and was confirmed under the optical microscope. The behavior of the cholesteric-nematic phase transition observed under the microscope at different frequencies was quite interesting. At low frequency, the distorted helical structures are observed vibrating energetically as the field approaches the critical value. The helical axes lie effectively in-plane. Helix unwinding begins at the spacers and the nematic phase grows from there. At several hundred Hz, the motion of domain boundaries becomes non-uniform. In this case, the helix unwinding undergoes two stages. The initial stage is similar to that at low frequency but the nematic phase is not homogeneous. Distorted helical structures with resemblance to isolated fingerprint texture coexist and are unwound from the finger-like tips.

At high frequency, the helical structure vibration and the motion of domain boundaries are not noticeable. Stable topological textures such as close-loop and isolated fingerprint-like textures coexist and are readily unwound as the field increases. Saturation in unwinding voltage was obvious at high frequency. The actual cause of this saturation and the smooth bump were not clear although we believed that it should be due to the ion segregation and the non-Newtonian viscous flow gradient in the deformed elastic medium. Usually, they are significant at low and intermediate frequencies. At the unwinding voltage, the deformation and flow gradient are so large that the perturbation approaches break down and the interplay of these effects will make the frequency dependence intricate.

Figure 19:
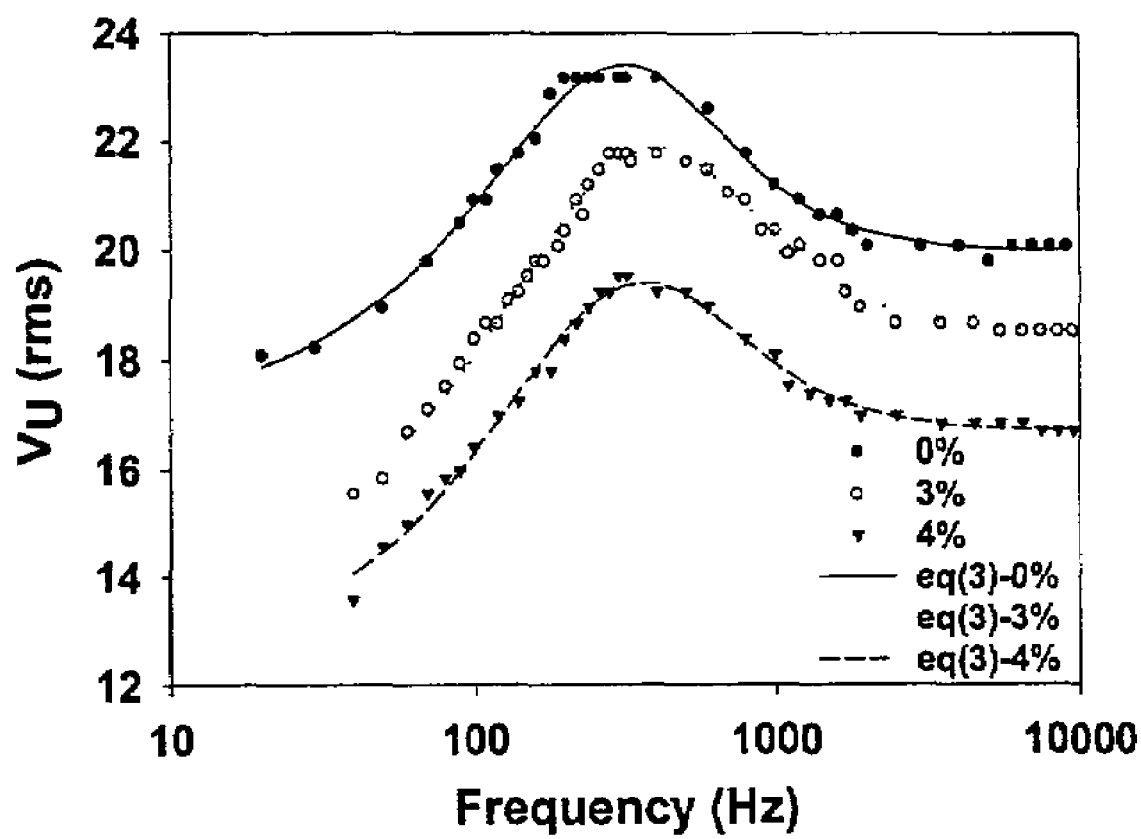
FIG. 19 shows the frequency dependence of rms helix unwinding voltage at different benzophenone concentrations in wt %.

In FIG. 19, the rms unwinding voltage was plotted as a function of the ac field frequency with different concentrations of benzophenone. The lines (solid, dotted and dashed) were theoretical fits using eq. (25). It can be seen that the agreement with data and theory is good. The values of the parameters used in the fitting procedure are listed in Table I. The shape of the curves in FIG. 19 are very similar. Physically, the reduction in the unwinding voltage can be explained as follows. The non-mesogenic dopant such as benzophenone, which does not exhibit the nematic phase but has a rod-like structure, effectively screens the intermolecular coupling between liquid crystal molecules and thus reducing the long-range order. This effectiveness depends on the steric and the dipole-dipole interactions, which essentially determine the quasi-nematic order of the cholesteric phase. These interactions can be easily upset by doping with the non-mesogenic compounds. Voltage reduction, low frequency roll-off and high frequency saturation have also been observed in 4-benzyl-biphenyl, diphenyl-2-pyridymethane and triphenyl-triazine. In addition, the cholesteric phase is destroyed in all the doped cases when the dopant concentration is greater than about a few percentages. Therefore, we conclude that this phenomenon is attributed to a reduction of the order parameter.

FIGS. 17 and 19 are important in determining the appropriate amount of dopants to reduce the helix unwinding voltage. From FIG. 17, it is concluded that the doping concentration should not be higher than 5%, at which point the reflectivity of the cholesteric liquid crystal display has decreased by almost 25%. From FIG. 19, it can be seen that at 4% doping concentration, the unwinding voltage is reduced by 15% at typical operation frequencies and more than 24% at lower frequencies. This is a significant reduction for bistable cholesteric displays where 6V/μm is typical for the helix unwinding voltage. For a 6 μm cell, the unwinding voltage becomes 24V instead of 36V.

In summary, a new formula has been derived relating the order parameter and the helix unwinding voltage in a cholesteric liquid crystal. The frequency dependence is also obtained. These formulas agree quite well with experimental observation. The reduction in unwinding voltage of doped cholesteric was attributed to a perturbation in the order parameter. Its extent depended on the structural and chemical properties of the doping chemicals. For benzophenone, it was shown that a small concentration of 4% could produce a sizeable change in the unwinding voltage. Therefore, the materials and ways to reduce the voltage are disclosed.

The invention claimed is:

1. A method for the grey-scale control of a reflective bistable cholesteric display, comprising:
    (a) applying clearing pulses to initially induce the cholestericnematic transition,
    (b) allowing the cholesteric liquid crystal molecules to relax to the planar texture,
    (c) setting the grey scale brightness level of a pixel by using a sequence of high and low pulses to modulate the cholesteric domain size and helical axis orientation, said grey scale brightness level being determined by the position in which one or more high pulses appear in said sequence of high and low pulses, and
    (d) allowing a relaxation period for stabilizing the coexistence of the planar and focal-conic textures;
    wherein step (c) is carried out after step (b) and before step (d).

2. A method as claimed in claim 1 wherein during the relaxation steps (b) and (d) voltage perturbations are kept below the threshold value.

3. A method as claimed in claim 1 wherein the reflectivity is controlled by varying the occurrence of the high pulses in step (c).

4. A method as claimed in claim 1 wherein the high and low pulses in step (c) are of the same pulses width.

5. A method as claimed in claim 4 wherein the high pulses have an amplitude above the threshold value and the low pulses have an amplitude below the threshold value.

6. A method as claimed in claim 1 wherein the high and low pulses in step (c) are of the different pulses width.

7. A method as claimed in claim 1 further comprising controlling the slew-rate of the waveform in step (c) by restricting the voltage amplitude and the pulse transition time to optimize the VLSI design and the electro-optical characteristics.

8. A method as claimed in claim 1 further comprising adding non-mesogenic dopants to the cholesteric liquid crystal.

9. A method as claimed in claim 8 wherein said non-mesogenic dopants are selected from benzoyl, benzyl, phenyl, biphenyl and triphenyl groups.

10. A method as claimed in claim 9 wherein said non-mesogenic dopants are selected from the group consisting of: benzoyl-benzene, 4-benzyl-biphenyl, diphenyl-2-pyridymethane and triphenyltriazine.

* * * * *

UNITED STATES PATENT AND TRADEMARK OFFICE
Certificate

Patent No. 7,696,971 B2                                                                                 Patented: April 13, 2010

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Wing Chiu Yip, Chai Wan HK); and Hoi Sing Kwok, Kowloon (HL).

Signed and Sealed this Twenty-Eighth Day of August 2012.

Lun-Yi Lao
*Supervisory Patent Examiner*
Art Unit 2629
Technology Center 2600